Patented Mar. 10, 1931

1,795,549

UNITED STATES PATENT OFFICE

PAUL FEILER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF DIOLEFINES

No Drawing. Application filed December 12, 1928, Serial No. 325,657, and in Germany February 11, 1928.

This invention relates to improvements in the manufacture and production of diolefines having conjugated double carbon bonds.

It is known that by the treatment of hydrocarbons of the ethylene series with solutions of certain metal salts such as silver salts, mercury salts or cuprous chloride, solutions of additive compounds of the metal salts with the olefines in question are obtained, from which the combined olefines can be readily split off by warming, evacuation and the like.

I have now found that also the diolefines having conjugated double carbon bonds, such as butadiene and its homologues, enter into combination with metal salts, and that the compounds can likewise be split up again in a simple manner and practically without loss, into metal salts and diolefines and that in this way butadiene hydrocarbons can be recovered from gaseous mixtures containing the same by treating the said gaseous mixtures with a salt of a heavy metal from the groups 1 and 2 of the periodic system, preferably in the univalent form and advantageously in solution, and liberating the diolefines from the resulting additive compounds. For example, if butadiene be treated with mercurous nitrate or silver nitrate, and preferably with solutions of these salts, it is absorbed with the formation of additive compounds. Under suitable working conditions, with solutions of other metal salts even precipitates of solid additive products can be obtained from butadiene or gases containing the same. Thus, for example, on agitating a hydrochloric acid solution of cuprous chloride with butadiene or gases containing the same, a yellowish precipitate is obtained of the solid additive compound of butadiene with cuprous chloride.

The resulting additive compounds can be decomposed, in a simple manner, into the corresponding metal salt and the butadiene hydrocarbon. Thus, for example, on heating the additive compound of butadiene and cuprous chloride, or on warming it with hydrochloric acid, if desired in vacuo, the butadiene is expelled, and the metal salt is recovered as such, or in solution. The resulting hydrochloric acid solution of cuprous chloride may be used for the recovery of further amounts of butadiene. The temperature at which the said resulting additive compounds are decomposed depends on the kind of the heavy metal salt and also on the pressure employed. According to the present invention the additive compounds are gradually heated until the temperature of decomposition is reached. This may easily be seen by the evolution of the diolefines from the said compounds. Temperatures of decomposition usually range from about 30° to 100° C.

If it be desired to isolate butadiene from mixtures with gases which are only sparingly soluble in solutions of metal salts, for example, hydrogen, nitrogen, oxygen, methane and the like, the gaseous mixture may simply be washed with solutions of silver salts or mercury salts, and the resulting absorbed butadiene hydrocarbons can be expelled from the solution by warming, in vacuo if desired. In the case, however, of gaseous mixtures which contain simple olefines in addition to butodiene, it is preferable to employ solutions of such metal salts as will furnish precipitates of solid additive products with hydrocarbons of the butadiene series alone. Thus, for example, when a hydrochloric acid solution of cuprous chloride is employed, the additive compounds of ethylene, propylene and butylene remain in solution, whereas the additive compound of butadiene separates out in solid form and can be filtered off and treated for the production of pure butadiene, as already described. The olefines can be recovered from the filtrate by warming, in vacuo if necessary, or by decomposition with an acid.

The following examples will further illustrate the nature of the invention, which however is not restricted thereto.

Example 1

110 parts by volume of a mixture of 50 per cent of butadiene and 50 per cent of nitrogen, are shaken up with 15 parts by volume of a hydrochloric acid solution of cuprous chloride, prepared from 300 grams of cuprous chloride, 1700 cc. of concentrated hydrochloric acid (sp. gr. 1.185) and 200 cc. of water. A yellow deposit is formed, in which practically the whole of the butadiene is contained in combination with cuprous chloride. From this additive compound, the butadiene can be easily recovered by heating.

*Example 2*

110 parts by volume of a mixture of 50 per cent of butadiene and 50 per cent of butylene, are shaken up with 15 parts by volume of the hydrochloric acid solution of cuprous chloride described in Example 1. A yellow deposit is formed. The residual butylene contains only small quantities of butadiene. The yellow precipitate is filtered off and decomposed by means of hydrochloric acid, pure butadiene being thus obtained.

*Example 3*

A gas mixture which has the composition 38 per cent of butadiene, 43.6 per cent of hydrogen, 15 per cent of methane and 3.4 per cent of nitrogen is treated at room-temperature in a scrubbing tower with a 10—N silver nitrate solution in which treatment the butadiene is absorbed by the silver nitrate. If 200 parts by volume of gas be passed through per hour and 4 parts by volume of silver nitrate be employed, the gas issuing from the solution is entirely free from butadiene. By heating the silver nitrate solution thus obtained or evacuating it, the absorbed butadiene may be recovered in a substantially pure form.

If the operation is carried out at lower temperatures, for example at about 0° C., a much higher output of gases may be attained. The solutions containing butadiene probably contain the compound $2AgNO_3 \cdot C_4H_6$.

*Example 4*

A gas mixture having the composition 46.4 per cent of butadiene and 53.6 per cent of nitrogen is shaken up at room-temperature with a solution of mercurous nitrate obtained by dissolving 90 parts by weight of the said salt in 1000 parts of water. The whole of the butadiene is absorbed. If the solution thus obtained be heated or treated in vacuo, the absorbed butadiene is recovered in a practically pure form. Also in this case it is advantageous to carry out the absorption at low temperatures.

What I claim is:—

1. A process for the recovery of diolefines having conjugated double carbon bonds from gaseous mixtures containing the same, which comprises treating the said gaseous mixtures with a salt of a heavy metal from groups 1 and 2 of the periodic system, and liberating the said diolefines from the resulting additive compounds.

2. A process for the recovery of diolefines having conjugated double carbon bonds from gaseous mixtures containing the same, which comprises treating the said gaseous mixtures with a solution of a salt of a heavy metal from groups 1 and 2 of the periodic system, and liberating the said diolefines from the resulting additive compounds.

3. A process for the recovery of diolefines having conjugated double carbon bonds from gaseous mixtures containing the same, which comprises treating the said gaseous mixtures with a salt of a heavy metal from groups 1 and 2 of the periodic system in the univalent form, and liberating the said diolefines from the resulting additive compounds.

4. A process for the recovery of diolefines having conjugated double carbon bonds from gaseous mixtures containing the same, which comprises treating the said gaseous mixtures with a solution of a salt of a heavy metal from groups 1 and 2 of the periodic system in the univalent form, and liberating the said diolefines from the resulting additive compounds.

5. A process for the recovery of diolefines having conjugated double carbon bonds from gaseous mixtures containing the same, which comprises treating the said gaseous mixtures with a salt of copper in the univalent form and liberating the said diolefines from the resulting additive compounds.

6. A process for the recovery of diolefines having conjugated double carbon bonds from gaseous mixtures containing the same, which comprises treating the said gaseous mixtures with a solution of a salt of copper in the univalent form, and liberating the said diolefines from the resulting additive compounds.

7. A process for the recovery of diolefines having conjugated double carbon bonds from gaseous mixtures containing the same, which comprises treating the said gaseous mixtures with a solution of cuprous chloride, and liberating the said diolefines from the resulting additive compounds.

In testimony whereof I have hereunto set my hand.

PAUL FEILER.